(12) United States Patent
Saint-Michel

(10) Patent No.: US 9,997,982 B2
(45) Date of Patent: Jun. 12, 2018

(54) ROTATING ELECTRICAL MACHINE COMPRISING AT LEAST ONE STATOR AND AT LEAST TWO ROTORS

(71) Applicant: MOTEURS LEROY-SOMER, Angouleme (FR)

(72) Inventor: Jacques Saint-Michel, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 275 days.

(21) Appl. No.: 14/858,814

(22) Filed: Sep. 18, 2015

(65) Prior Publication Data

US 2016/0087514 A1 Mar. 24, 2016

(30) Foreign Application Priority Data

Sep. 18, 2014 (FR) ...................................... 14 58838

(51) Int. Cl.
| | | |
|---|---|---|
| *H02K 16/00* | (2006.01) | |
| *H02K 21/12* | (2006.01) | |
| *H02K 1/27* | (2006.01) | |
| *H02K 16/02* | (2006.01) | |
| *H02K 19/24* | (2006.01) | |
| *H02K 21/04* | (2006.01) | |
| *H02K 21/24* | (2006.01) | |

(Continued)

(52) U.S. Cl.
CPC .............. *H02K 16/02* (2013.01); *H02K 1/243* (2013.01); *H02K 19/103* (2013.01); *H02K 19/24* (2013.01); *H02K 21/048* (2013.01); *H02K 21/24* (2013.01)

(58) Field of Classification Search
CPC .................................. H02K 1/22; H02K 5/04

USPC .... 310/114, 156.25, 156.64, 156.66, 156.71, 310/267, 268
See application file for complete search history.

(56) References Cited

U.S. PATENT DOCUMENTS 2,557,249 A * 6/1951 Aske ........................ H02K 1/16
310/112
3,435,267 A * 3/1969 Bering ..................... H02K 1/06
310/168

(Continued)

FOREIGN PATENT DOCUMENTS

EP 0 261 953 A2 3/1988
EP 2 037 558 A1 3/2009

(Continued)

OTHER PUBLICATIONS

May 27, 2015 Search Report issued in French Patent Application No. 1458838.

(Continued)

*Primary Examiner* — Jose Gonzalez Quinone
(74) *Attorney, Agent, or Firm* — Oliff PLC

(57) ABSTRACT

The present invention relates to a rotating electrical machine including at least one stator and at least two rotors, which are arranged on either side of the stator along an axis of rotation of the machine,
said at least one stator including teeth and windings arranged on the teeth, and
each of said at least two rotors including two mutually coaxial rotor armatures, each bearing claw-poles arranged to interact magnetically with the teeth of the stator, the claw-poles of an armature being arranged circumferentially in alternation with the claw-poles of the other armature.

13 Claims, 13 Drawing Sheets

Figure 1:
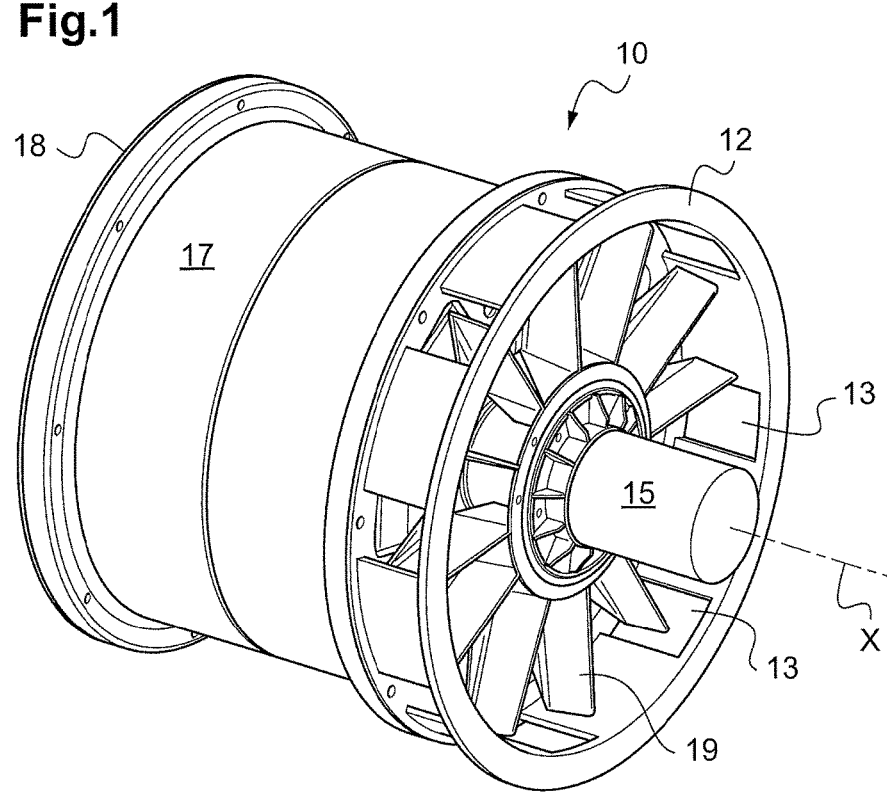

(51) Int. Cl.
*H02K 19/10* (2006.01)
*H02K 1/24* (2006.01)

(56) References Cited

U.S. PATENT DOCUMENTS

| | | | |
|---|---|---|---|
| 6,177,746 B1* | 1/2001 | Tupper | H02K 7/025 |
| | | | 310/114 |
| 6,404,097 B1* | 6/2002 | Pullen | H02K 1/2793 |
| | | | 310/156.62 |
| 7,466,057 B2 | 12/2008 | Imai et al. | |
| 7,608,972 B2 | 10/2009 | Aoki et al. | |
| 7,791,244 B2 | 9/2010 | Enomoto et al. | |
| 2009/0096310 A1* | 4/2009 | Takeuchi | H02K 15/026 |
| | | | 310/156.36 |
| 2010/0127594 A1* | 5/2010 | Takeda | H02K 1/243 |
| | | | 310/263 |

FOREIGN PATENT DOCUMENTS

| | | |
|---|---|---|
| FR | 1 356 802 A | 3/1964 |
| FR | 2 071 289 A5 | 9/1971 |
| WO | 99/56380 A2 | 11/1999 |

OTHER PUBLICATIONS

Jan. 9, 2018 Office Action issued in European Patent Application No. 15 184 624.3.

* cited by examiner

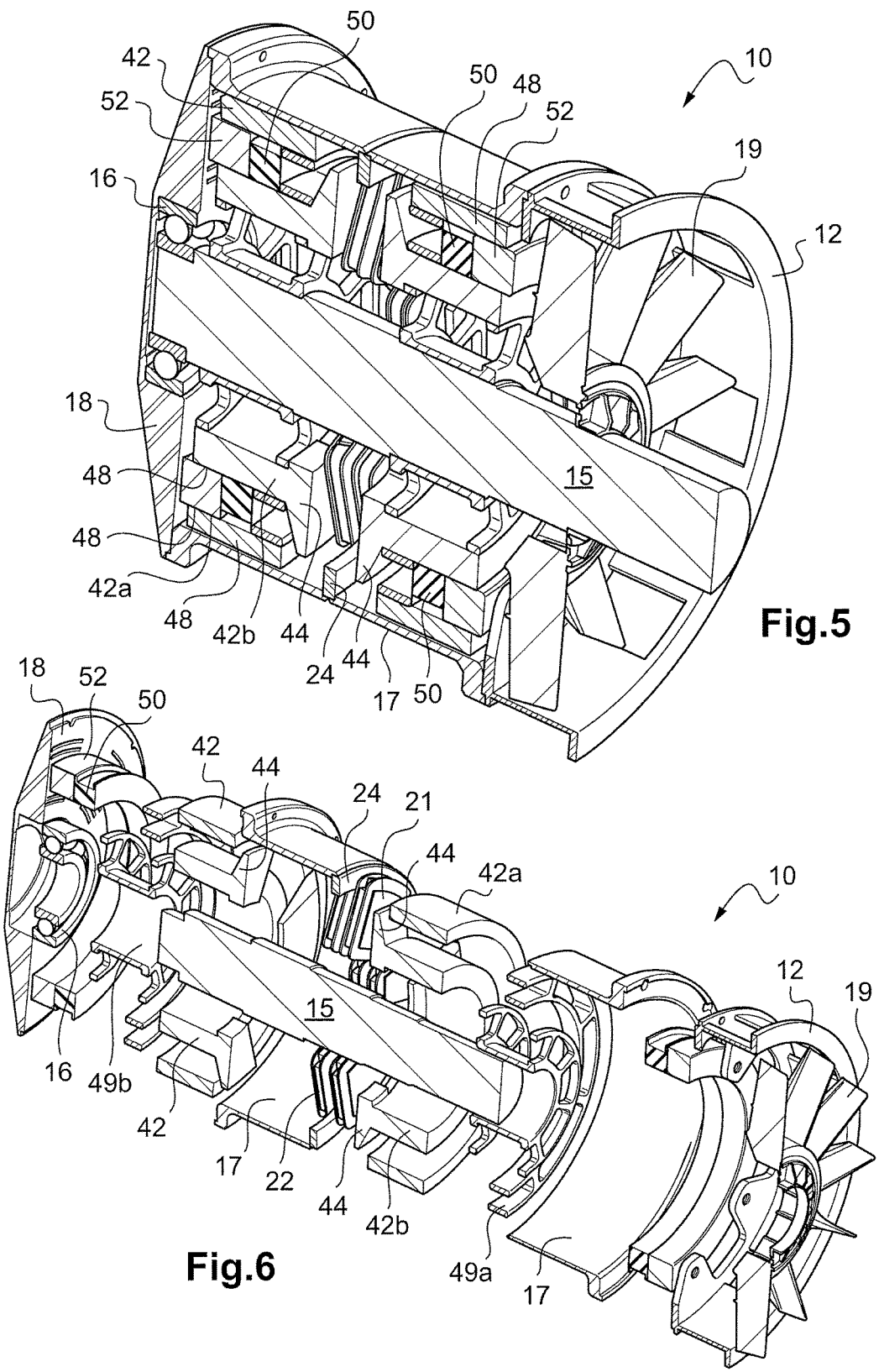

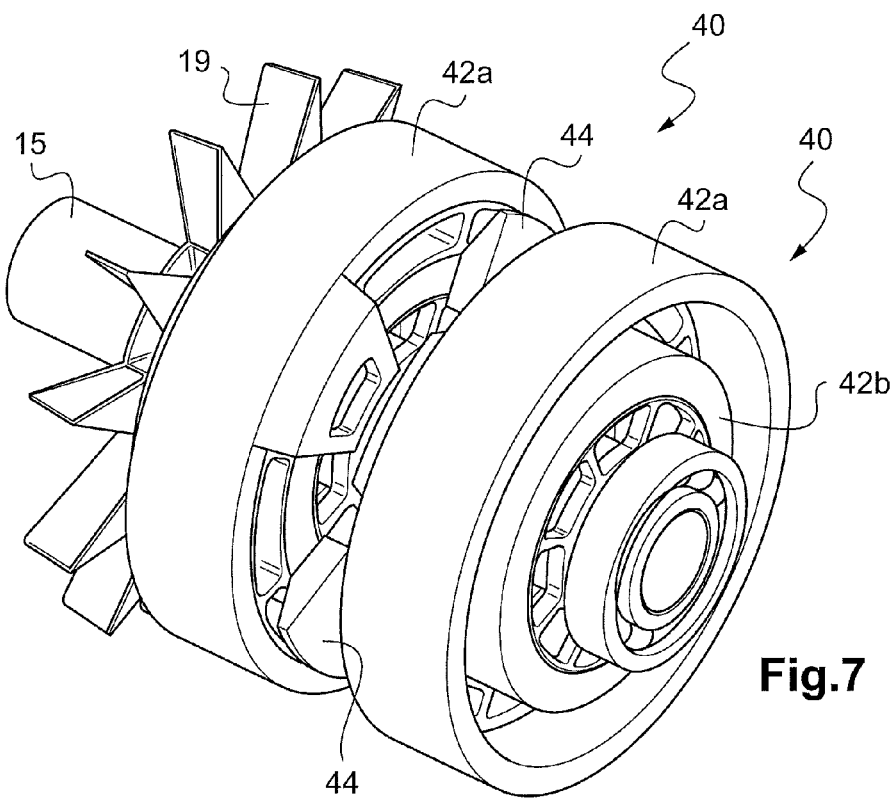
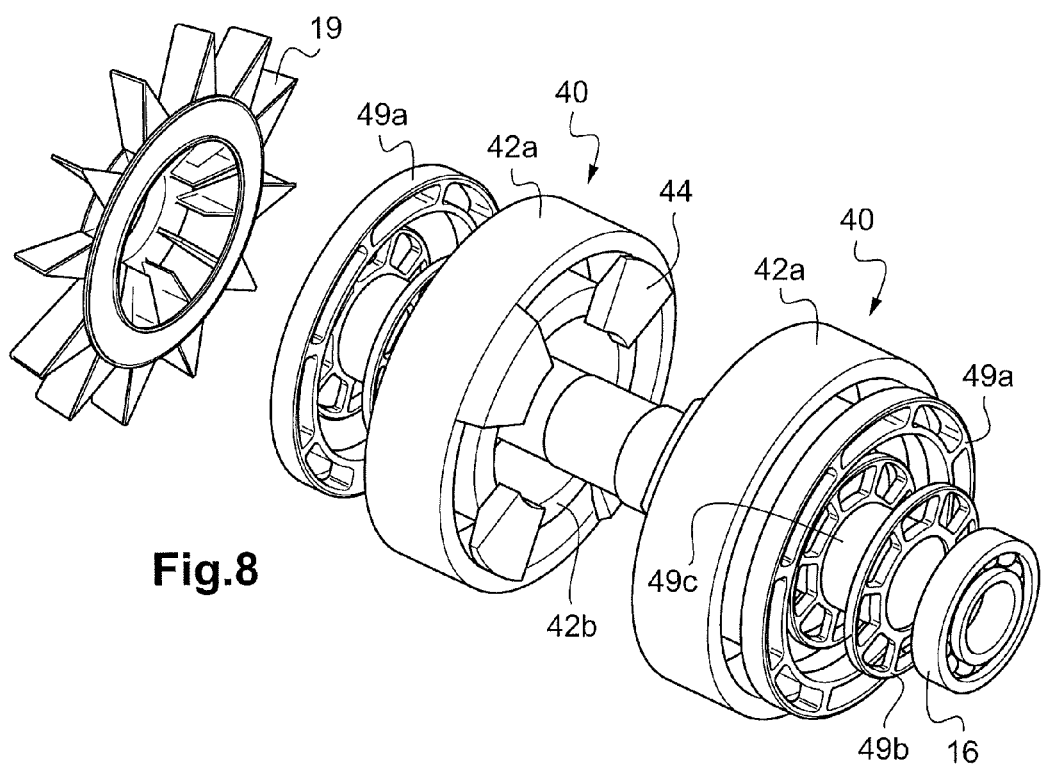

ROTATING ELECTRICAL MACHINE COMPRISING AT LEAST ONE STATOR AND AT LEAST TWO ROTORS

The present invention relates to the field of rotating electrical machines, and more particularly that of rotating electrical machines with axial flux.

"Axial flux" should be understood to mean that the flux is oriented in the air gap formed between the rotor and the stator in a direction parallel to an axis of rotation of the machine, by contrast with a so-called radial flux machine, in which the flux circulates between the rotor and the stator in a direction at right angles to the axis of rotation of the machine.

Radial flux claw-pole machines are known, for example from the patents U.S. Pat. No. 7,791,244, U.S. Pat. No. 7,608,972, U.S. Pat. No. 7,466,057.

The invention relates equally to alternators and motors.

The invention is addressed more particularly to the rotating electrical machines comprising an excitation winding, and whose field winding flux may be adjusted according to requirements via an adjustable direct current which powers it.

The subject of the invention is thus a rotating electrical machine comprising at least one stator and at least two rotors, which are arranged on either side of the stator along an axis of rotation of the machine, said at least one stator comprising teeth and windings arranged on the teeth, and each of said at least two rotors comprising two cylindrical and mutually coaxial rotor armatures, each bearing claw-poles arranged to interact magnetically with the teeth of the stator, notably with passage of the magnetic flux in a direction parallel to the axis of rotation of the machine, the claw-poles of an armature being arranged circumferentially in alternation with the claw-poles of the other armature.

The claw-poles preferably face the teeth of the stator according to the axis of rotation of the machine. Thus, the magnetic flux is oriented in the air gap formed between the rotor and the stator in a direction substantially parallel to the axis of rotation of the machine.

"Arranged circumferentially in alternation" means that, when moving circumferentially about the axis of rotation of the machine, a claw-pole attached to a cylindrical rotor armature of a rotor, and then a claw-pole attached to the other cylindrical rotor armature of the same rotor, which is coaxial to the first armature, are encountered in succession.

Stator

The windings of the stator are preferably each wound around a winding axis parallel to the axis of rotation of the machine.

The teeth of the stator may each be of generally substantially prismatic form, comprising, for example, in cross section taken at right angles to the axis of rotation of the machine, two portions of concentric circles linked by two radii. The windings of the stator may be of corresponding form. The teeth of the stator have a front face facing the claw-poles of each of the rotors. Said faces are preferably planar and extend at right angles to the axis of rotation of the machine. The stator may comprise at least six teeth, for example 6, 8 or 12 teeth, even more.

The teeth of the stator may be attached to an annular stator armature. The teeth may be produced of a single piece with this annular stator armature, or, as a variant, be kept on by any means such as, for example, bonding, welding, screwing, joining, for example by dovetails, this list not being exhaustive.

The teeth may be formed from a stack of plates, held secured together by any means such as, for example, bonding, snap-fitting, riveting and attached to the annular stator armature for example by screwing. The plates may be stacked on a stacking axis at right angles to the axis of rotation of the machine. The cutting of the teeth from the stack of plates may be designed in such a way as to reduce the material losses. It is for example performed with the teeth oriented head-to-tail, so as to avoid scrap. For equivalent cost, it is possible to use, to produce the teeth, a more expensive magnetic material, for example of better quality and more efficient.

The teeth may also be produced from an isotropic material, such as, for example, magnetic powders agglomerated by printing or bonding, or by the addition of metal according to the so-called 3D printing methods.

The annular stator armature is preferably amagnetic. It is for example made of aluminum. Thus, the stator need not have any magnetic yoke, which is less costly. As a variant, the annular stator armature is not amagnetic.

The teeth are configured in such a way that they may extend on one side only or on either side of the annular stator armature by a distance d, which may be between 10 and 200% of the height h of the tooth measured along a radius of the machine.

The teeth of the stator may each bear two windings arranged on the corresponding tooth on either side of the annular stator armature, each of the two windings facing one of the two rotors. The teeth of the stator may notably be attached by their middle to said annular stator armature. The two resulting half-teeth may be of the same size, as may the windings that they bear.

The stator may be symmetrical relative to a plane perpendicular to the axis of rotation of the machine.

The windings may be wound on a support intended itself to be threaded onto the corresponding tooth. This support is preferably produced from an electrically insulating material, for example plastic material.

The stator preferably has concentrated winding, that is to say is wound on teeth. The winding of the stator is multiphase. The number of phases may be at least 3, being for example equal to 3, or greater than 3, for example 5, 7, 11, 13, or 17, or even more.

The electrical conductors of the windings of the stator may be arranged in the corresponding winding "loose", or on the contrary by being "arranged". The windings may be produced in the form of distributed windings, being for example distributed in multiple stages, with any even number of layers. Such a configuration may be favorable to reducing the harmonics of space linked to the distribution of the windings, as is often the practice in the machines of conventional topologies.

The electrical conductors of the windings of the stator may be produced with wires of circular, or oblong, cross section, the conductor then being called "flat wire". The wires used may be insulated at low voltage, being enameled or even enameled and covered, or at medium voltage, being insulated by mica paper for example, or even at very high voltage, being for example produced with high-voltage cable.

The cooling of the windings may be produced by the gas contained in the machine, for example air, by forced convection for example, or not, or, as a variant, by a liquid circulating in pipe coils included appropriately in the windings, even in the wires themselves of the windings, which may then be produced with hollow electrical conductors.

Said at least one stator need not have claw-poles, unlike the rotors. This may also be the case for all the stators of the machine, as appropriate.

Rotor

Each of the rotors may comprise a toroidal excitation coil arranged between the two cylindrical and coaxial rotor armatures. This excitation coil makes it possible to generate a magnetic flux in the cylindrical and coaxial rotor armatures and in the claw-poles which face the stator. This excitation coil is coaxial to the axis of rotation of the machine. An advantage of this configuration is that a single coil is sufficient to power all the poles of a same polarity, hence a reduced cost for the machine.

Furthermore, a machine with so-called global excitation, that is to say comprising a single excitation coil for all the poles, presents the advantage of being a lesser consumer of conductive materials than a machine with distributed excitation such as a machine with protruding poles or with smooth rotor.

Thus, the machine according to the invention makes it possible to aggregate the advantages of machines with so-called global excitation with those of axial flux machines. The machine according to the invention is both compact and powerful.

The excitation coil may be fixed relative to the stator. In other words, the excitation coil is not driven in rotation, when the cylindrical rotor armatures and the claw-poles are so driven. Thus, the powering of the rotor is facilitated. No rotating power supply system is needed. In the invention, the presence of fixed excitation coils makes it easier for them to be powered, which may be performed directly from an external source, such as a battery, an auxiliary network, or by drawing off from the terminals of the machine, this list not being exhaustive. The excitation current may be adjusted by an appropriate fixed electronic device.

Each of the rotors may further comprise a fixed ferromagnetic ring arranged so as to be passed through radially by the field winding magnetic flux. The excitation coil is secured to this ferromagnetic ring.

Each of the rotors may comprise two auxiliary rotor air gaps, each of the auxiliary rotor air gaps being formed respectively between the ferromagnetic ring of said rotor and one of the cylindrical rotor armatures. The magnetic flux circulating in said rotor passes through the two auxiliary rotor air gaps radially. The two auxiliary rotor air gaps are each of cylindrical form and are mutually coaxial.

As a variant, the excitation coil may be driven in rotation. In this case, the auxiliary rotor air gaps are eliminated, and the coil is secured to the cylindrical rotor armatures. The performance levels of the machine may be improved thereby. However, it is essential to use, for example, brushes, or an excitation rotating machine to power the excitation coil.

Each of the cylindrical armatures of a rotor may comprise a number of claw-poles equal to half the number of poles of the machine. "Number of poles of the machine" should be understood to mean the total number of claw-poles of a rotor facing the stator that are encountered on moving circumferentially around the axis of the machine. The number of poles may be greater than or equal to 4. It may notably be 4, 6 or 8, or even more. In a variant embodiment, the number of poles of the machine is 4.

The claw-poles attached to a same cylindrical rotor armature may be of the same polarity. All the claw-poles of a same polarity of a rotor may be attached to a same cylindrical rotor armature. All the claw-poles of north polarity of a rotor may be attached to a first cylindrical rotor armature. All the claw-poles of south polarity of a rotor may be attached to a second cylindrical rotor armature.

The two rotors surrounding the stator may be angularly offset relative to one another. Such a configuration may make it possible to reduce torque ripples and make it possible to cancel a space harmonic or minimize a chosen set of space harmonics.

At least one rotor, or better, each of the two rotors, even all the rotors of the machine, need not have permanent magnets. The rotor or rotors, even all the rotors of the machine, is/are wound. "Wound rotor" describes a rotor comprising at least one coil in which an electrical current may circulate that is likely to create a magnetic field when the rotor is rotating. This magnetic field circulates in the ferromagnetic ring of the rotor, in the cylindrical and coaxial rotor armatures and in the claw-poles thereof.

The machine according to the invention need not have permanent magnets, as explained above. Nevertheless, in a variant embodiment of the invention, the machine comprises permanent magnets, notably permanent magnets arranged between the claw-poles of the rotors, in order to make it possible to minimize the magnetic flux leaks. These magnets exhibit a direction of magnetization that is circumferential relative to the axis of rotation.

The structure of the coaxial cylindrical armatures of the rotor makes it possible to achieve high rotation speeds. It is possible, for example, to reach a peripheral speed of the rotor of the order of 150 m/s without taking any particular precautions.

The machine further comprises a shaft driven in rotation about the axis of rotation of the machine, which supports the cylindrical and coaxial rotor armatures of the rotors, and the claw-poles that they bear.

This shaft is secured to the rotors, and rests by at least one bearing, for example one or two bearings, on a casing of the machine, notably one or two end flanges of the machine.

The two rotors may be entirely symmetrical or substantially symmetrical relative to one another, relative to a plane at right angles to the axis of rotation of the machine. The slight lack of symmetry may, for example, stem from the number of bearings bearing the shaft of the machine. The rotors may in particular be symmetrical relative to one another with regard to the magnetic part, namely the cylindrical and coaxial rotor armatures, the claw-poles, the toroidal excitation coils and the ferromagnetic rings, not including any angular offset.

The rotors may each also comprise, in order to reinforce the structure of the machine, two coaxial frameworks making it possible to improve the mechanical transmission and the centering on the shaft. One may be arranged between the two cylindrical rotor armatures and the other inside the innermost cylindrical rotor armature, that is to say between the inner cylindrical rotor armature and the shaft of the machine. These frameworks may be non-magnetic, for example of aluminum, so as not to disturb the circulation of the magnetic flux. The outermost framework, namely that arranged between the two cylindrical rotor armatures, may enable a better cohesion of the machine, which is then said to be reinforced.

At least one or more of the rotor elements, chosen from the claw-poles, the cylindrical rotor armatures, the ferromagnetic rings, may be wholly or partly produced by means of one or more solid magnetic materials, for example chosen from: gray iron, spherulitic graphite cast iron, soft magnetic composites, also called SMC, cast steel, forged steel, this list not being exhaustive.

As a variant, or in addition, one or more of the elements of the rotors, chosen from the claw-poles, the cylindrical rotor armatures, the ferromagnetic rings, may be wholly or partly laminated, being produced by a stacking of magnetic plates. The claw-poles of the rotors may notably be laminated, being produced by a stacking of magnetic plates.

The cooling of the excitation coils of the rotor may be produced in the same manner as that of the windings of the stator, inasmuch as the excitation coils of the rotor are fixed and may therefore be advantageously cooled by circulation of fluid, liquid or gas. Thus, the cooling may be produced by the gas contained in the machine, for example air, by forced convection for example, or not, or, as a variant, by a liquid circulating in pipe coils appropriately included in the coils, even in the wires themselves of the coils, which may then be produced with hollow conductors.

Machine

The machine according to the invention may form a motor. In the case of a motor, the number of poles of the machine may be at least 8, being, for example, 8 or 12. One of the benefits of such a machine is its compactness.

As a variant, the machine may also form a generator. In this case, it may comprise 4 or 6 poles for example. In a variant embodiment, the machine comprises, for example, 4 poles and 6 teeth.

The machine may be made airtight. A partial vacuum may be formed therein, for example less than 0.3 bar, or a light gas may even be introduced therein, for example hydrogen or helium. This may make it possible to minimize the aeraulic losses, and thus make it possible to operate at higher speeds, for example greater than 150 m/s as peripheral speed of the rotor.

The ventilation of the machine may be forced, by suction of air into the machine. This suction may be done through the middle of the machine, given its structure with two rotors arranged on either side of the stator.

Another subject of the invention is a rotating electrical machine comprising a plurality of machines as described above, each consisting of a stator and two rotors, arranged on a common axis of rotation. Such a machine comprises, for example, two assemblies each consisting of a stator and two rotors, even more, for example three or four assemblies, or even more, as a function of the desired electrical or mechanical power.

The notable subject of the invention is a machine comprising three machines according to the invention, each consisting of a stator and two rotors arranged on a common axis of rotation, in which the windings of the stators are three-phase, with one phase per stator.

Figure 2:
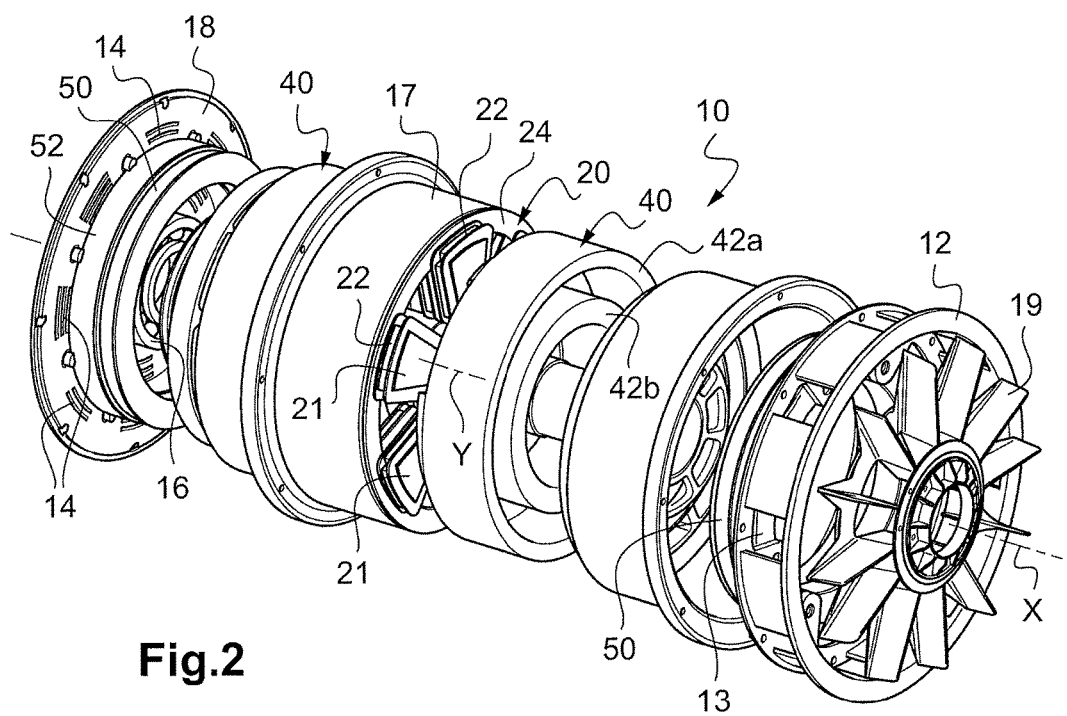
Figure 3:
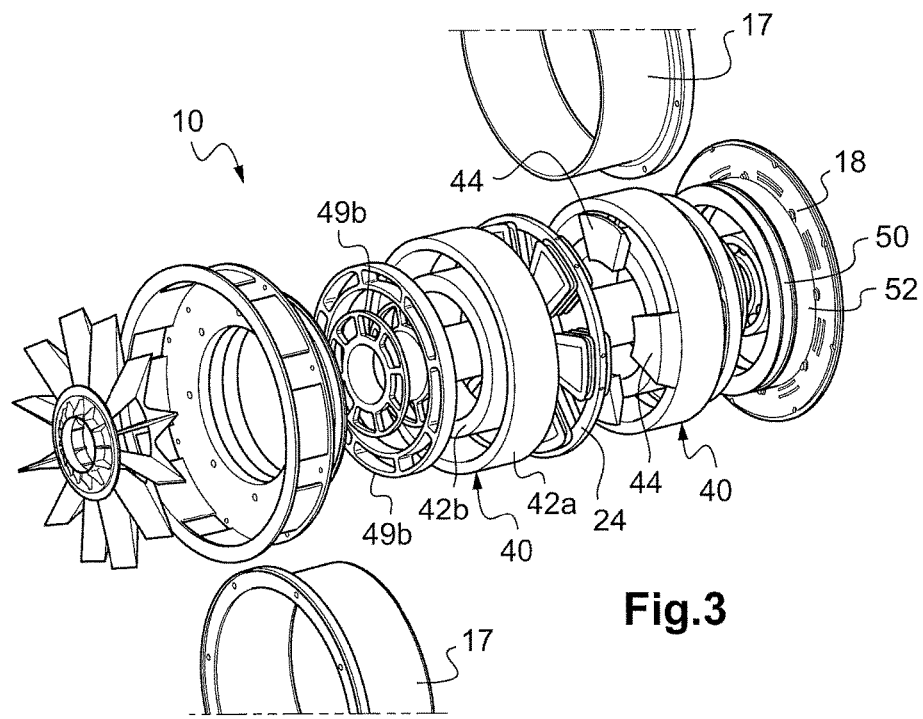
Figure 4:
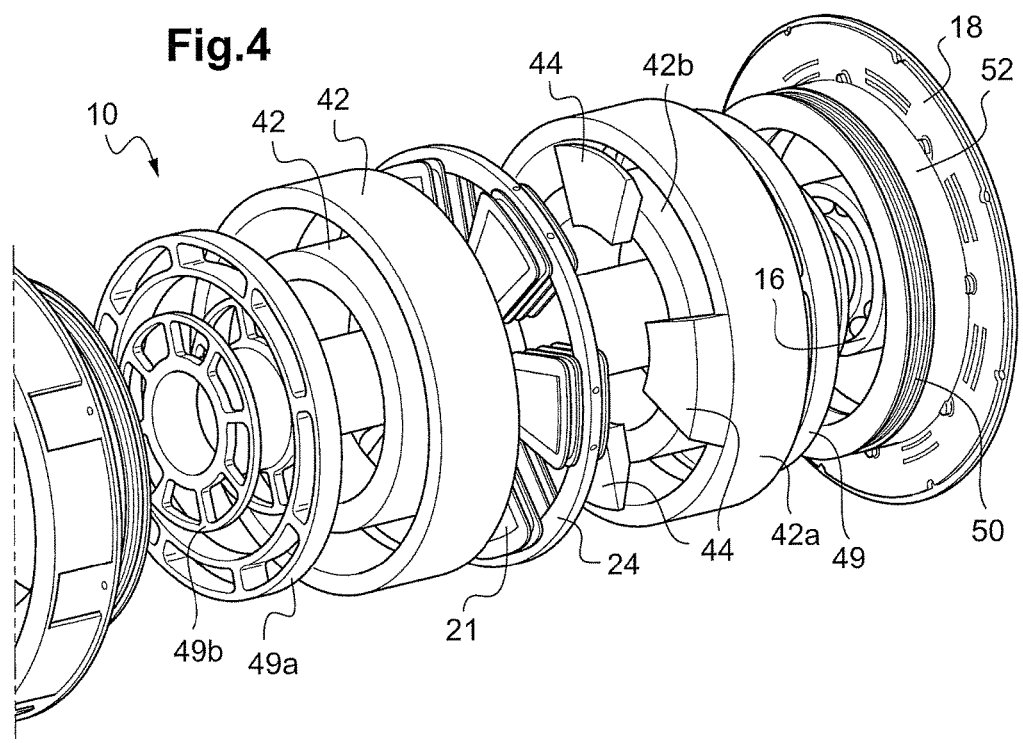
Figure 9:
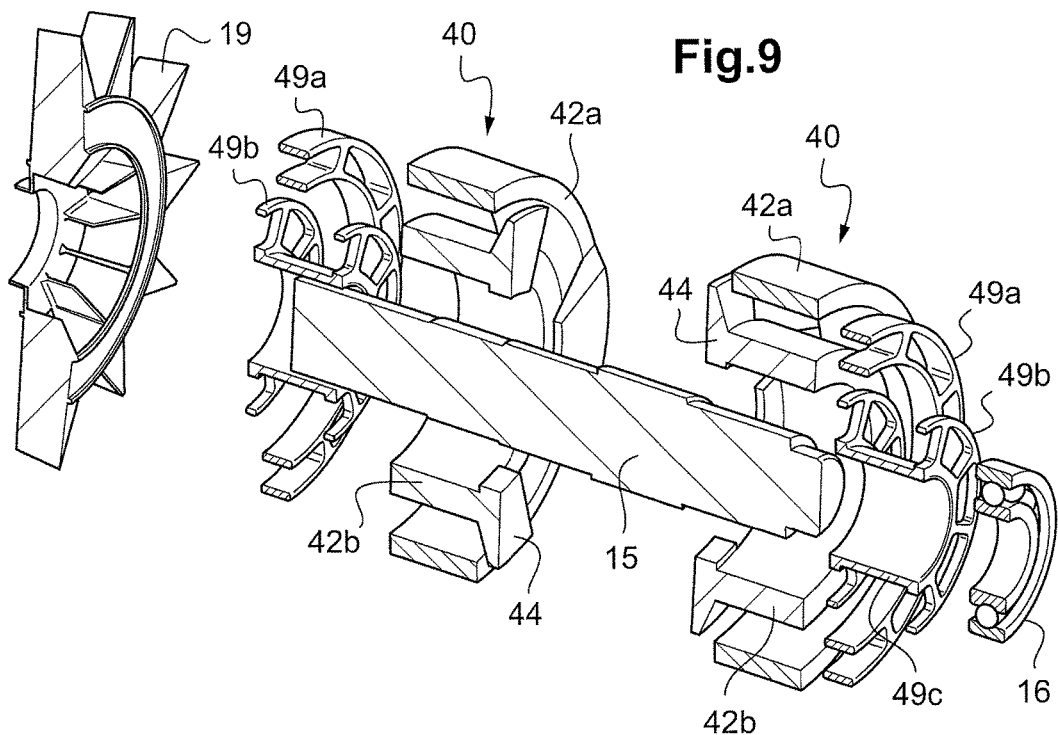
Figure 10:
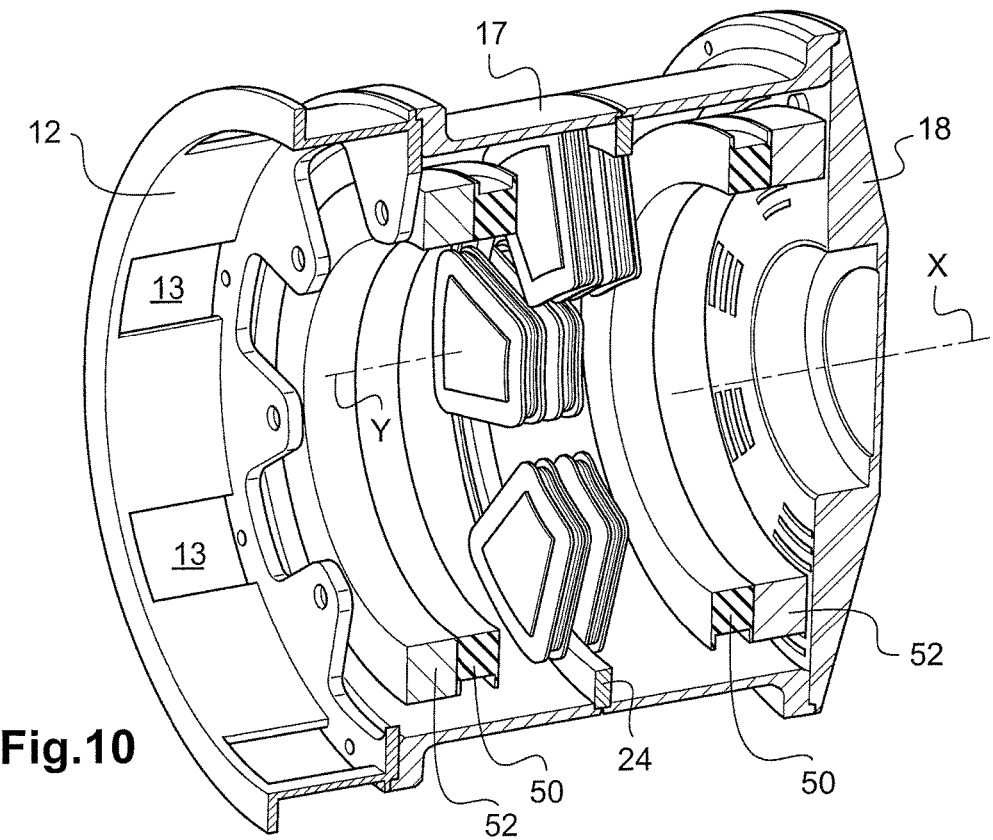
Figure 11:
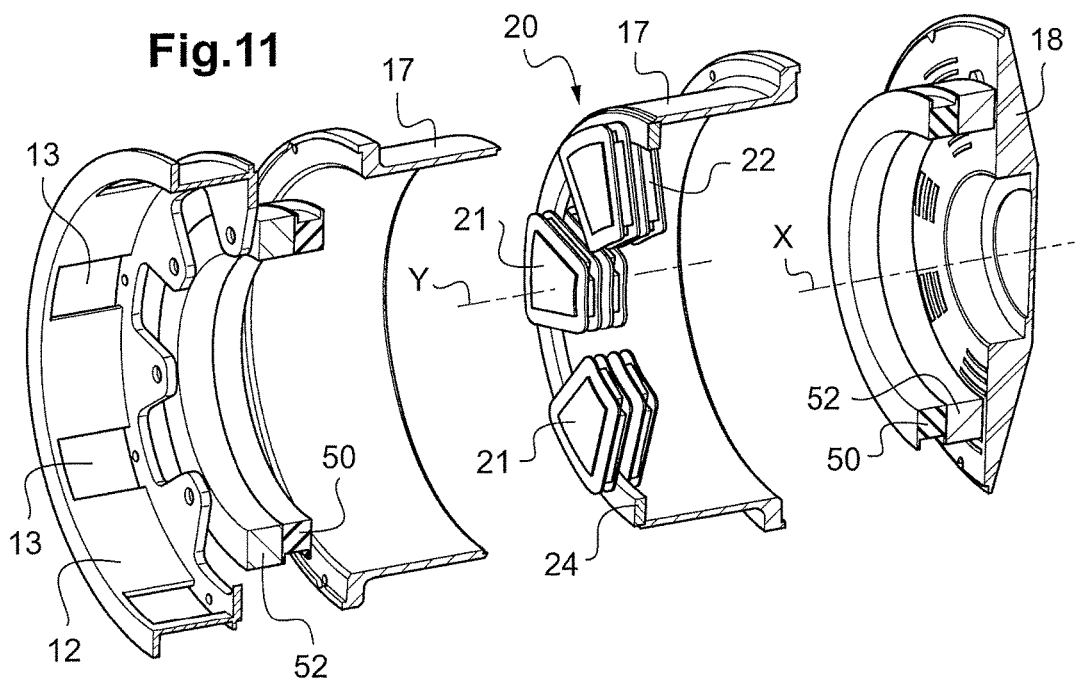
Figure 12:
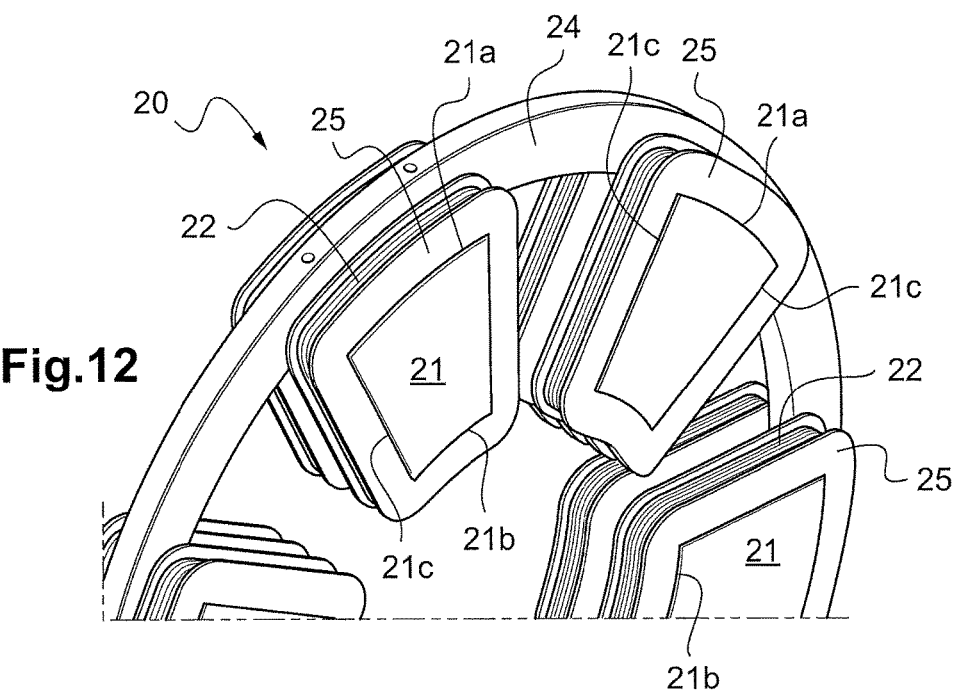
Figure 13:
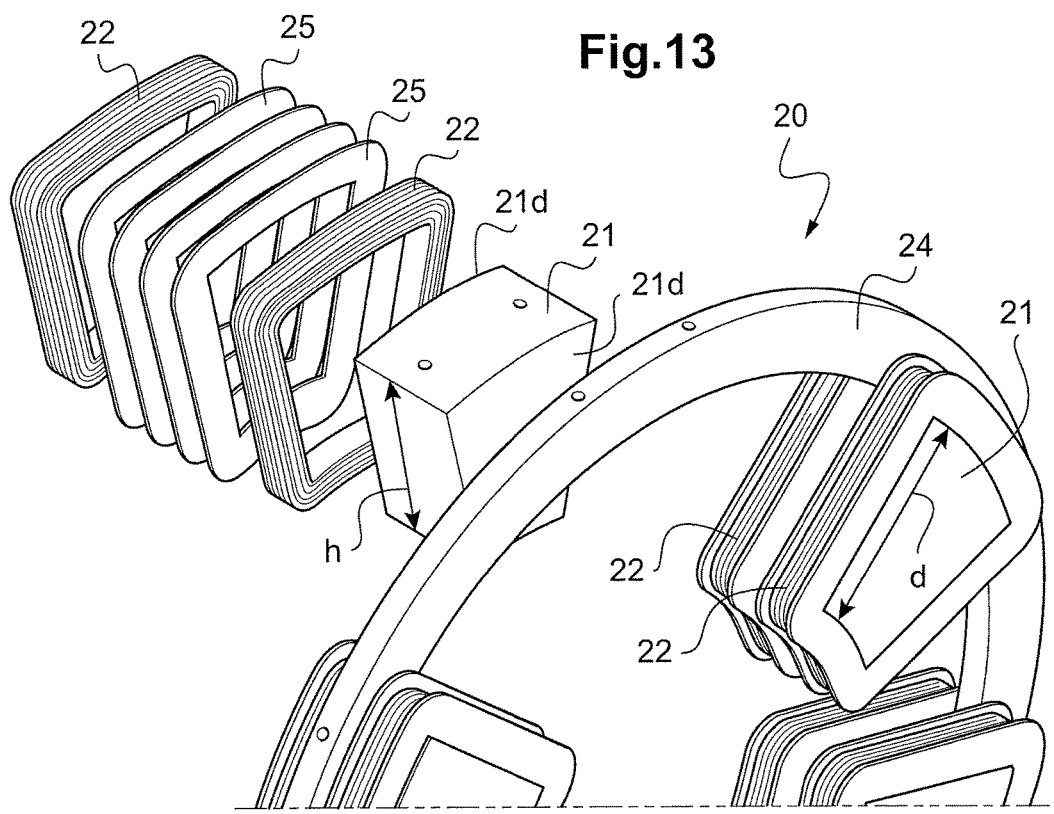
Figure 14:
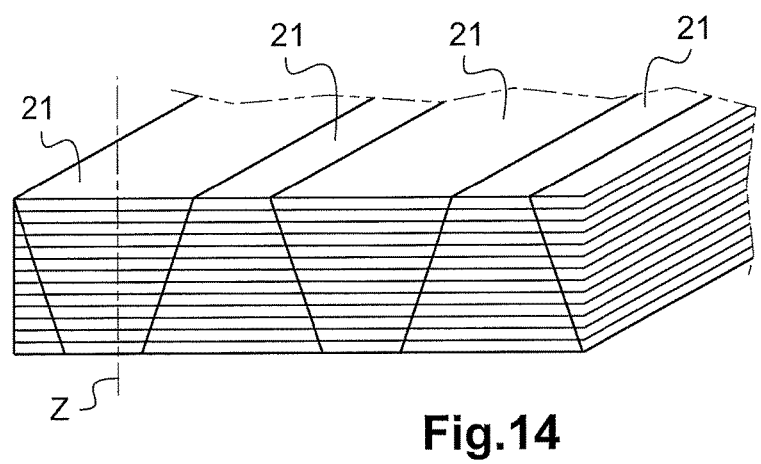
Figure 15:
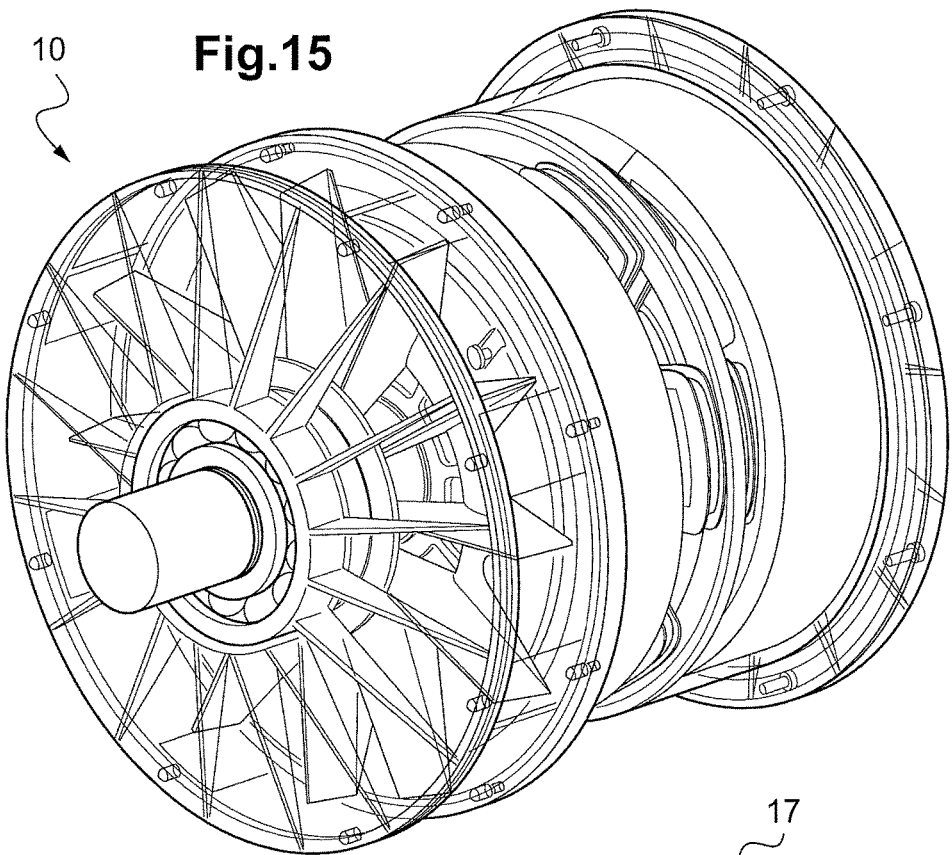
Figure 16:
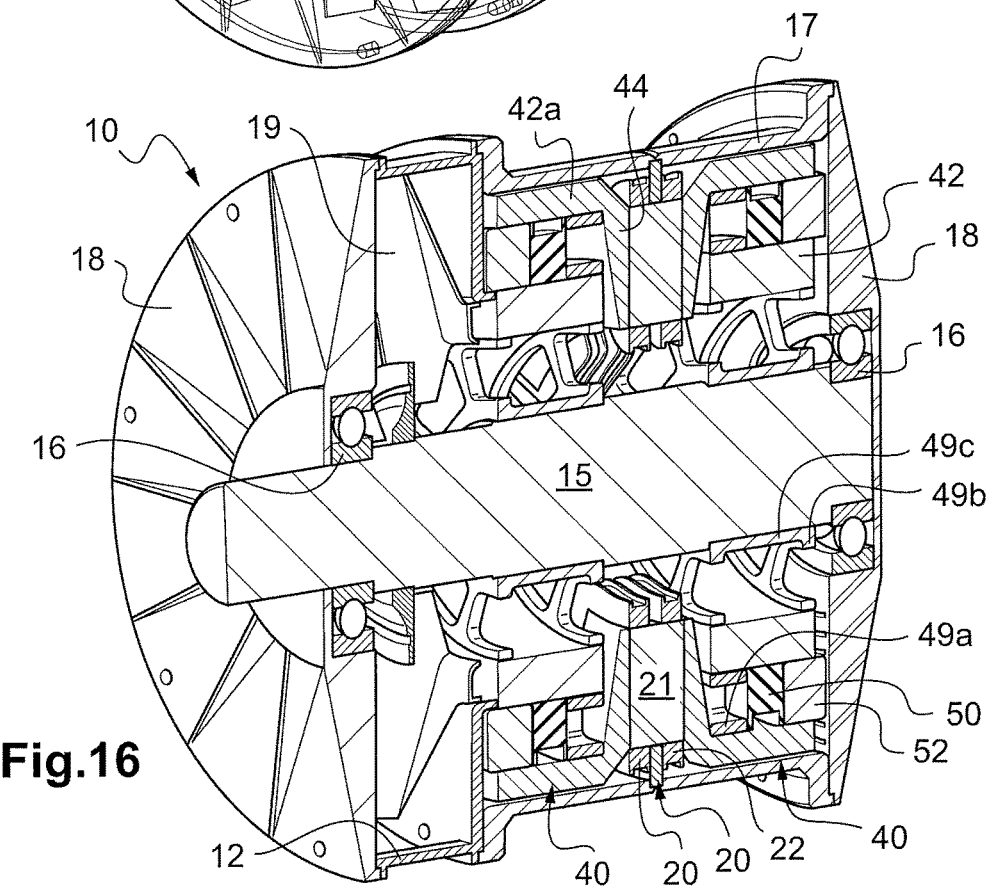
Figure 17:
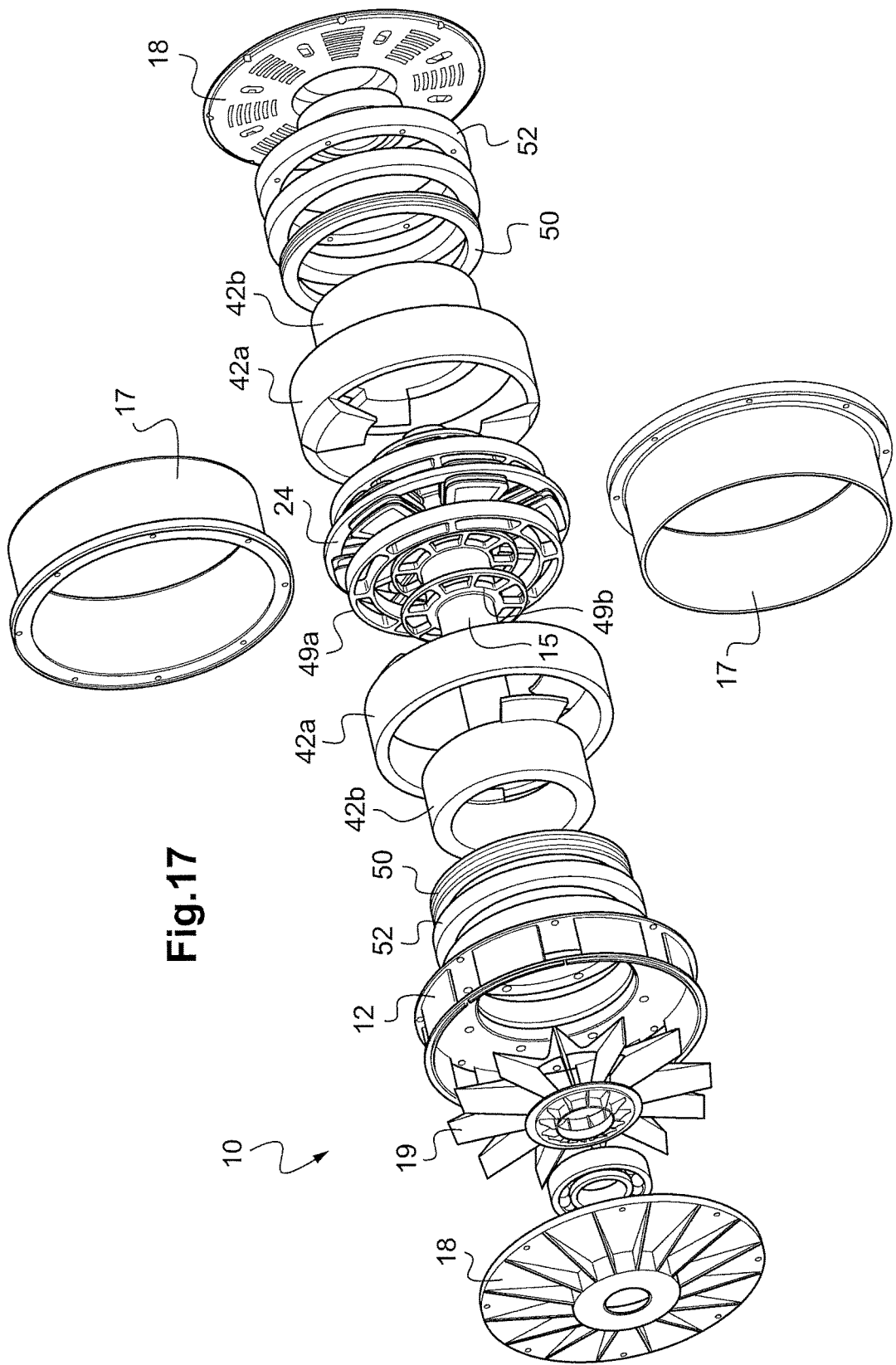
Figure 18:
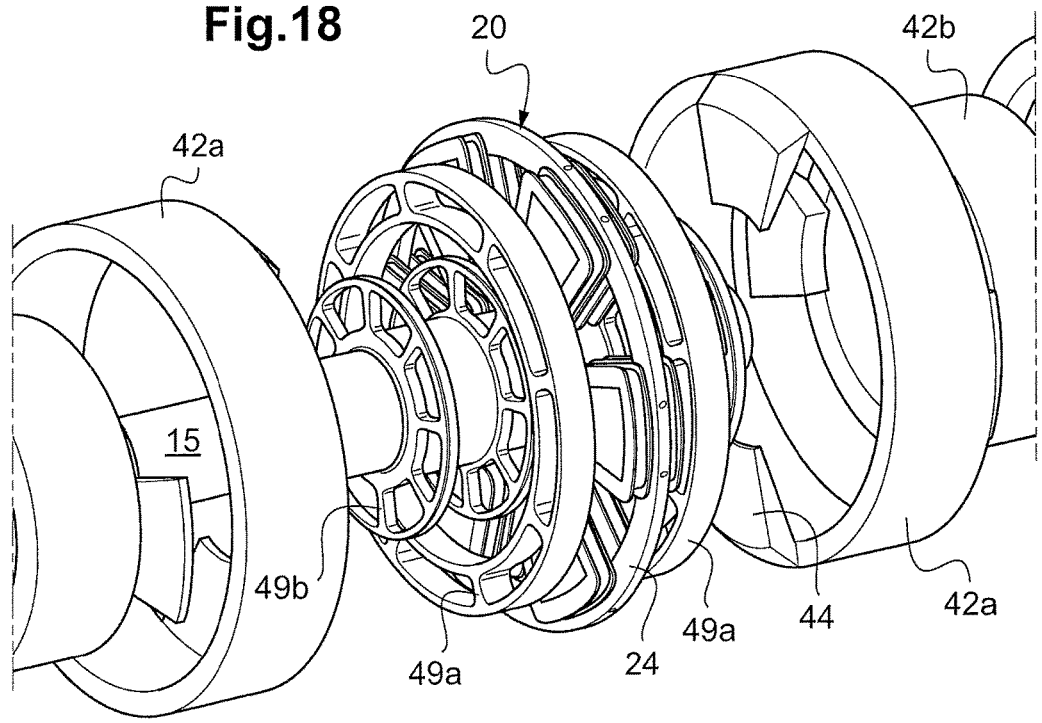
Figure 19:
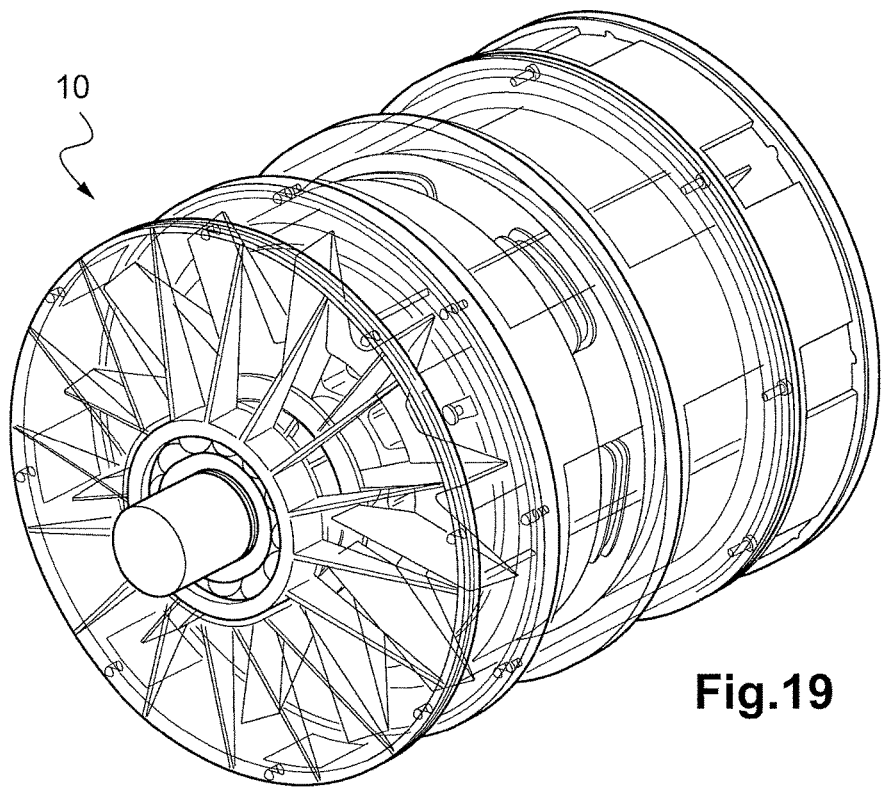
Figure 20:
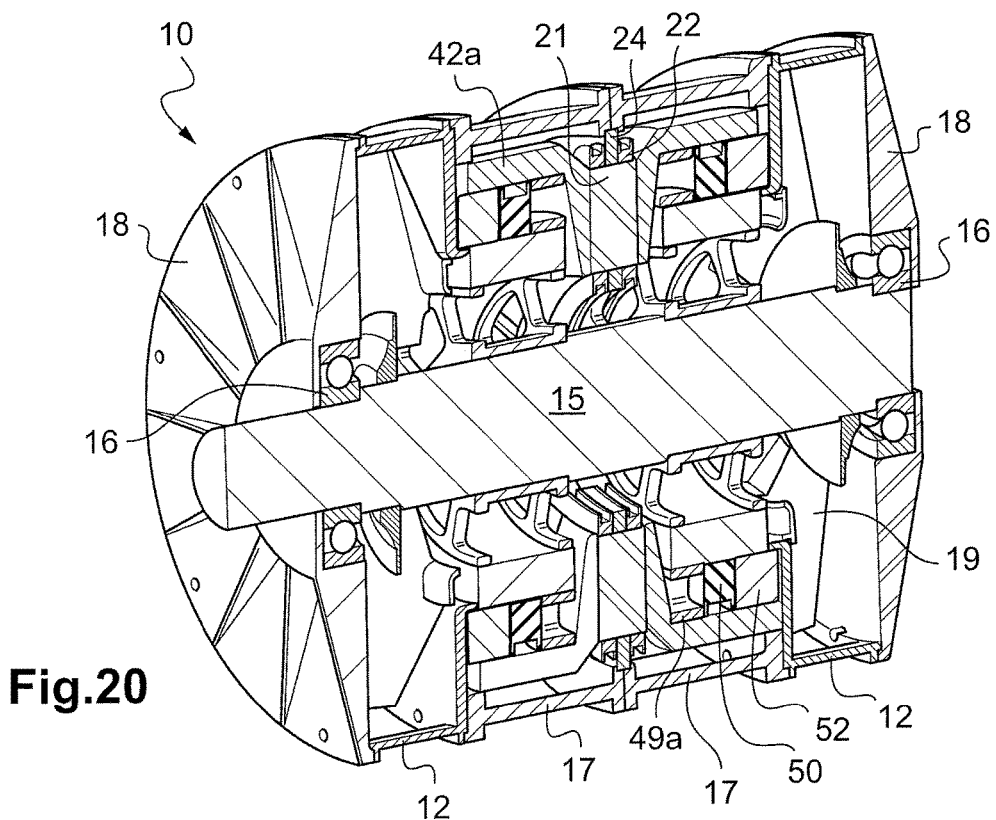
Figure 21:
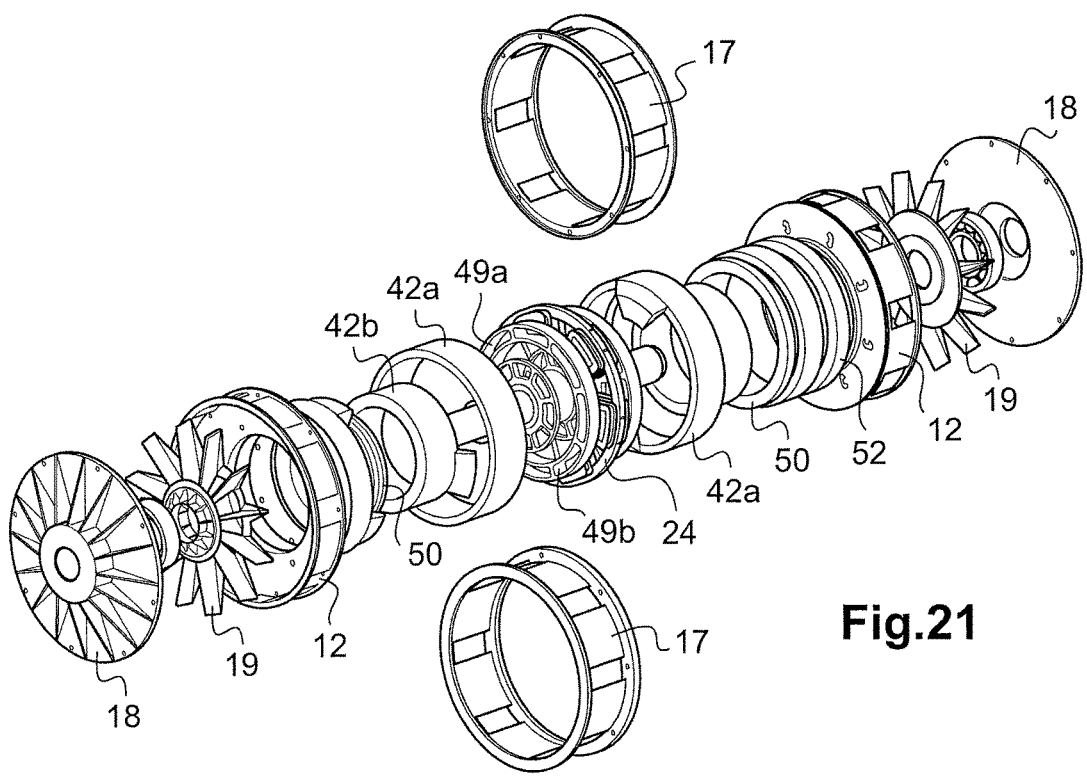
Figure 22:
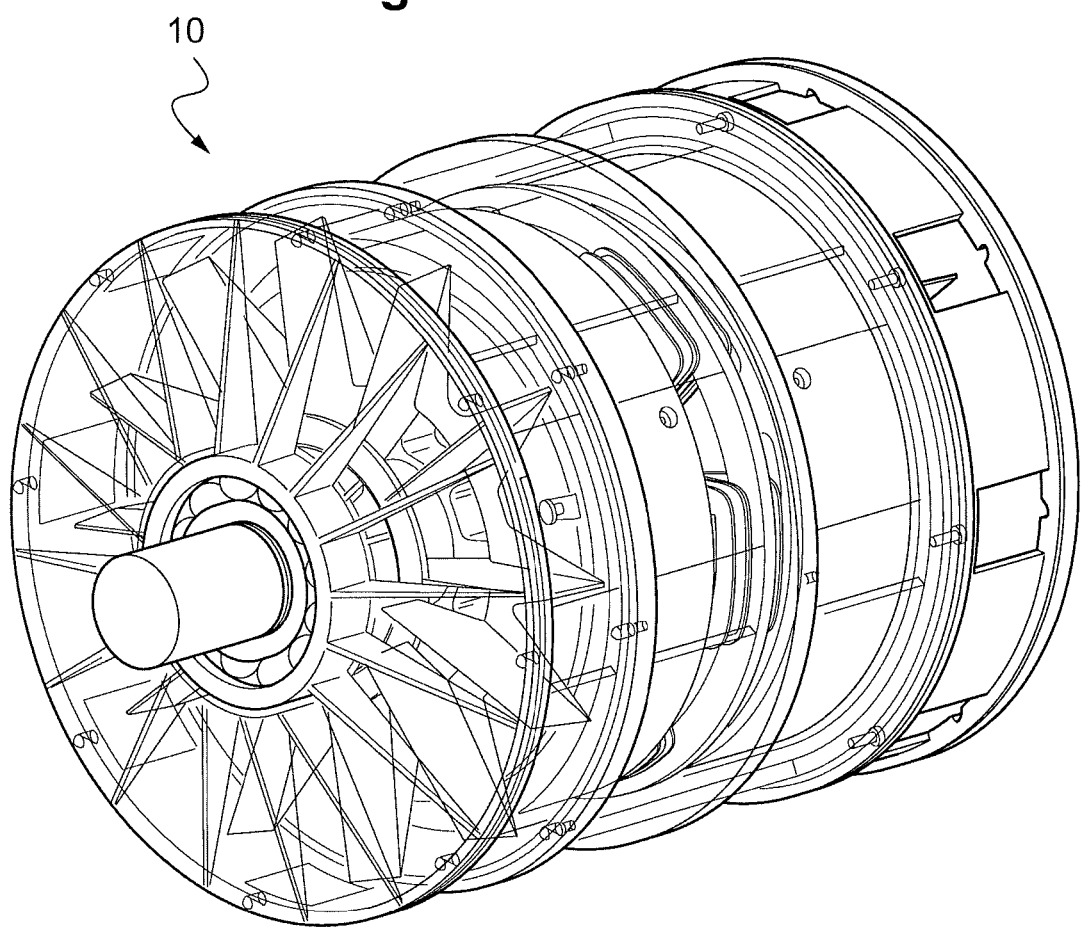
Figure 23:
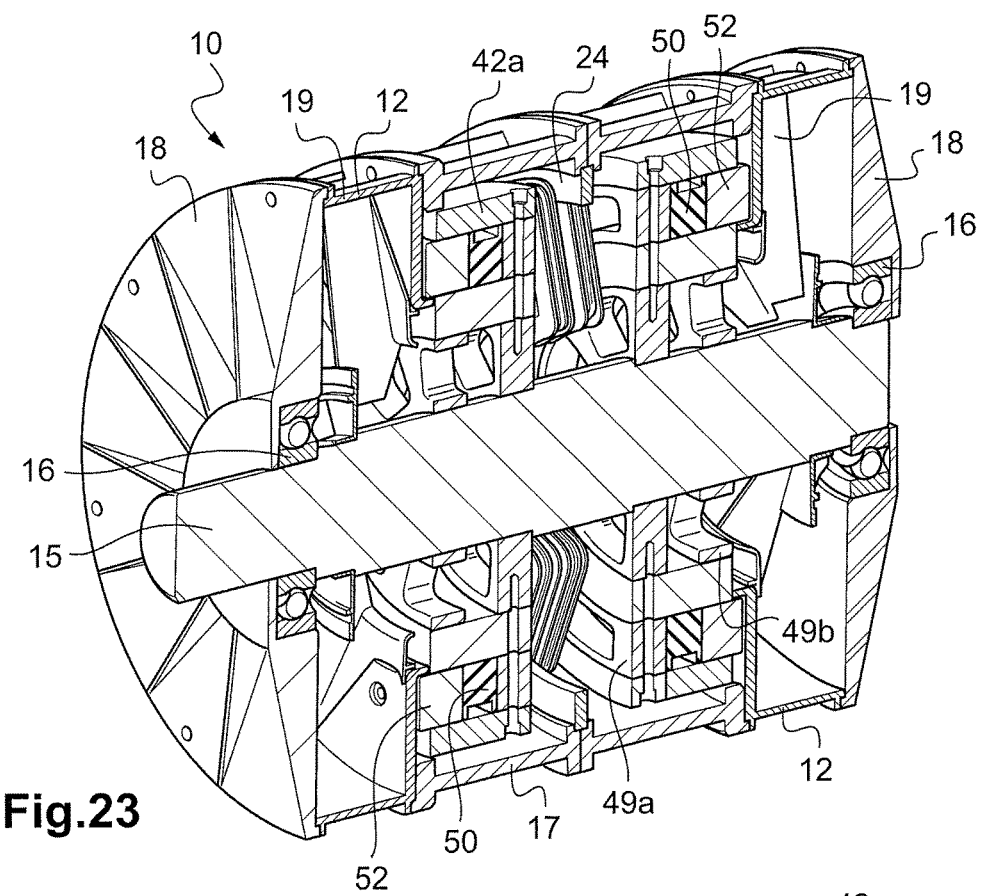
Figure 24:
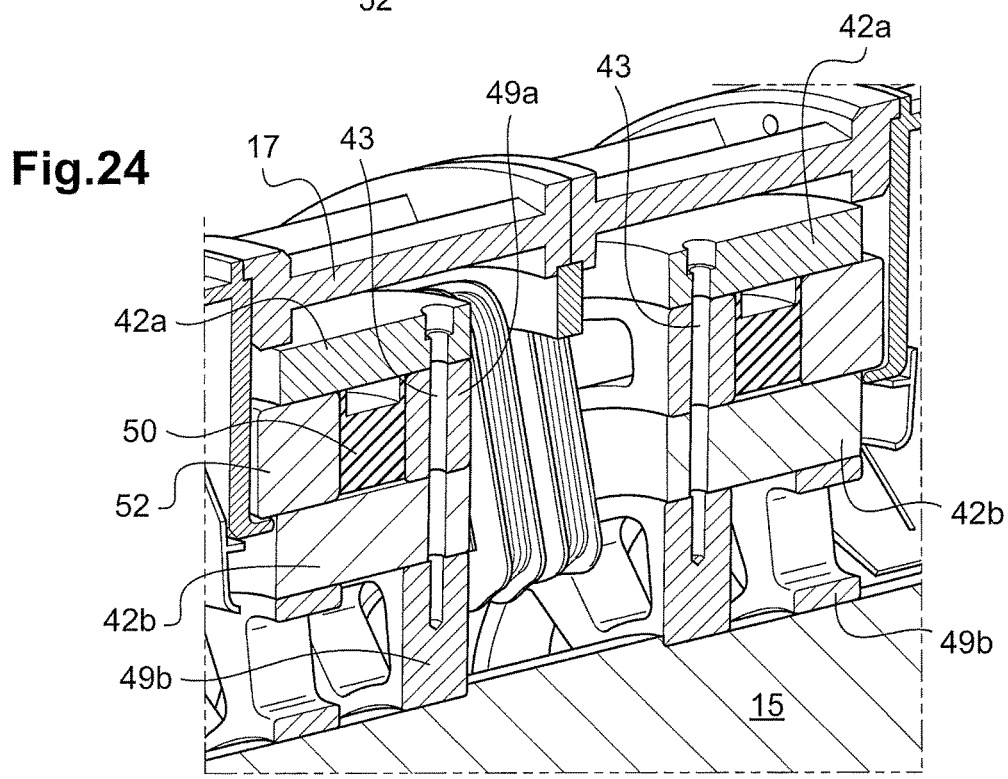

The invention will be better understood on reading the following detailed description of nonlimiting exemplary embodiments thereof, and on studying the attached drawing, in which:

FIG. 1 is a perspective view of a machine produced in accordance with the invention, FIGS. 2 and 3 are exploded perspective views of the machine of FIG. 1, FIG. 4 is a more detailed view, FIGS. 5 and 6 are longitudinal cross-sectional views, respectively in the compact assembled and exploded states, of the machine of FIGS. 1 to 4, FIGS. 7 and 8 are views respectively in the assembled and exploded states, of the rotating parts of the machine of FIGS. 1 to 6, FIG. 9 is an exploded view thereof in longitudinal cross section, FIGS. 10 and 11 are longitudinal cross-sectional views, respectively in the assembled and exploded states, of the fixed parts of the machine of FIGS. 1 to 9, FIG. 12 is a perspective view of the stator of the machine of FIGS. 1 to 11, FIG. 13 is an exploded view thereof, FIG. 14 illustrates a method for manufacturing teeth of the stator, FIG. 15 is a perspective view of a variant embodiment with two bearings, FIG. 16 is a view in the assembled state in longitudinal cross section, FIG. 17 is an exploded perspective view of the machine of FIGS. 15 and 16, FIG. 18 is a more detailed view thereof, FIG. 19 is a perspective view of a variant embodiment with two bearings and with central suction, FIG. 20 is a longitudinal cross section thereof, FIG. 21 is an exploded perspective view of the machine of FIGS. 19 and 20, FIG. 22 is a perspective view of a variant embodiment with two bearings, with central suction and with reinforced cohesion, FIG. 23 is a longitudinal cross section thereof, and FIG. 24 is a detail view thereof.

FIGS. 1 to 13 illustrate a rotating electrical machine 10 according to the invention, comprising a stator 20 and two rotors 40, arranged respectively on either side of the stator 20 along the axis of rotation X of the machine.

FIGS. 7 to 9 illustrate the rotating parts of the machine, and FIGS. 10 to 13 the fixed parts.

The stator comprises teeth 21 and windings 22 arranged on the teeth 21. As may be seen notably in FIG. 11, the windings 22 are each wound around a winding axis Y parallel to the axis of rotation X of the machine.

The teeth 21 of the stator 20 each comprise two half-teeth. Each half-tooth bears a winding 22. The two half-teeth are arranged on either side of an annular stator armature 24, each of the two windings facing one of the two rotors 40. The half-teeth are, for example, attached by their middle to the armature 24, for example by screwing. FIG. 13 shows the holes for the passage of the screws, oriented radially. The two half-teeth are of the same size, as are the windings that they bear. The stator is thus symmetrical relative to a median plane for the stator, at right angles to the axis of rotation X of the machine. Each winding is wound on a support 25 arranged on the corresponding half-tooth. This support 25 is preferably made of an electrically insulating material, for example plastic material. In the example described, the annular stator armature 24 is amagnetic.

The teeth 21 are configured in such a way that they extend on one side of the annular stator armature 24 by a distance d, which, in the example illustrated in FIG. 13, is equal to 100% of the height h of the tooth measured along a radius of the machine. This distance d may be between 10 and 200% of the height h of the tooth. As a variant, the teeth could extend radially on either side of the annular stator armature without departing from the scope of the invention.

The teeth 21 are delimited, when observed along the axis X, by two portions of concentric circles 21a and 21b linked by two radii 21c. The windings 22 are of corresponding form. The teeth 21 have two main faces 21d each facing a rotor 40. The faces 21d are planar and extend at right angles to the axis of rotation X of the machine. In the example described, the stator comprises six teeth, but could comprise 8 or 12 thereof, or even more.

The teeth 21 may be formed as a stacking of plates, kept secured together by any means. The plates may be stacked along a stacking axis Z at right angles to the axis of rotation X of the machine. The cutting of the teeth 21 in the stacking of plates may be performed so as to avoid, or at least minimize, the losses. It may be performed with the teeth obtained head-to-tail, so as not to create any, or create very little, scrap, as illustrated in FIG. 14, Each of the two rotors 40 comprises two cylindrical and mutually coaxial rotor armatures 42a and 42b, each bearing claw-poles 44 arranged axially facing the teeth 21 of the stator 20, as may be seen notably in FIG. 5. The claw-poles 44 of a rotor face the teeth 21. The claw-poles 44 of a first armature 42a are arranged circumferentially in alternation with the claw-poles 44 of the second armature 42b. In other words, when moving circumferentially about the axis of rotation X of the machine, a claw-pole 44 attached to the first cylindrical rotor armature 42a of a rotor, then a claw-pole 44 attached to the second cylindrical rotor armature 42 of the same rotor, are encountered in succession.

Each of the rotors 40 further comprises, as may be seen notably in FIGS. 6 and 10, a toroidal excitation coil 50 arranged between the two cylindrical and coaxial rotor armatures 42a and 42b. This excitation coil 50 makes it possible to generate a magnetic flux in the cylindrical and coaxial rotor armatures 42a and 42b and in the claw-poles 44 which face the stator 20. This excitation coil 50 is coaxial to the axis of rotation X of the machine.

In the example described, the excitation coil 50 is fixed relative to the stator 20. The excitation coil is not driven in rotation, when the cylindrical rotor armatures 42a and 42b and the claw-poles 44 are so driven.

Each of the rotors 40 further comprises a ferromagnetic ring 52, also fixed, arranged so as to be passed through radially by the field winding magnetic flux. The excitation coil 50 is secured to this ferromagnetic ring 52.

Two auxiliary rotor air gaps 48 are formed respectively between the ferromagnetic ring 52 of the rotor and one of the cylindrical rotor armatures 42a or 42b. The magnetic flux circulating in the rotor passes through the two auxiliary rotor air gaps 48 radially. The two auxiliary rotor air gaps 48 are coaxial.

In the example described, each of the cylindrical armatures of a rotor 40 comprises two claw-poles, the rotors having four poles. The number of claw-poles is equal to half the number of poles of the machine. The number of poles can, as a variant, be greater than 4. It may notably be 6 or 8, or even more.

The rotors also advantageously each comprise, as may be seen notably in FIG. 8, in order to reinforce the structure of the machine, two coaxial frameworks 49a and 49b making it possible to improve the mechanical transmission and the centering on the shaft 15. One, 49a, is arranged between the two cylindrical rotor armatures 42a and 42b, being adjacent to the excitation coil 50 and takes the form of two coaxial wheels linked by portions of radii. The other, 49b, is arranged inside the inner cylindrical rotor armature 42b, that is to say between the inner cylindrical rotor armature 42b and the shaft 15 of the machine, and takes the form of two disks arranged side-by-side, each comprising two coaxial wheels linked by radii, the two adjacent disks being linked by a central ferrule 49c held on the shaft 15 between the two adjacent disks.

These frameworks 49a and 49b may be non-magnetic, for example of aluminum, in order not to disturb the circulation of the magnetic flux. The outermost framework 49a, namely that arranged between the two cylindrical rotor armatures, may enable a better cohesion of the machine.

The two rotors surrounding the stator are, in the example described, arranged face-to-face, being not angularly offset relative to one another. The rotors could also be angularly offset relative to one another.

The machine 10 comprises a shaft 15 secured to the rotors 40, which rests by a bearing 16 on a casing 17 of the machine, notably an end flange 18 of the machine 10, that may be seen in FIG. 6.

The machine also comprises, arranged on the shaft 15 opposite the end flange 18, a fan 19 housed in a ferrule 12, driven by the shaft 15. The ferrule 12 includes openings 13 allowing air, which may enter into the machine through grilles 14 formed in the end flange 18, to leave.

In a variant embodiment illustrated in FIGS. 15 to 18, and as may be seen more particularly in FIG. 16, the shaft 15 rests by rolling bearings 16 on the casing 17 of the machine, and more particularly on the two end flanges 18 of the machine 10.

In this particular case, the ferrule 12 housing the fan 19 is closed on the side opposite the rotors and the stator by the second end flange 18. Because of this, the machine is slightly asymmetrical, this asymmetry being due to the presence of the fan 19 on one side of the machine.

In another variant embodiment illustrated in FIGS. 19 to 21, the casing 17 comprises two fans 19 arranged at each of the ends of the machine, in ferrules 12 each closed by an end flange 18. Furthermore, the casing 17 comprises openings 17a, allowing air to enter into the machine through its center, then the air to circulate inside the machine to cool it, and to leave through the openings 13 of the ferrules 12 on either side of the machine, symmetrically.

In another variant embodiment, illustrated in FIGS. 22 to 24, each rotor 40 comprises drill-holes 43 passing through both the two cylindrical rotor armatures 42a and 42b and the two coaxial frameworks 49a and 49b, in order to receive amagnetic securing screws making it possible to reinforce the cohesion of the rotors 40.

The operation of the machine will now be described. The current circulating in the excitation coils 50 of the rotors 40 and the rotation of the claw-poles 44 of these rotors create a magnetic flux circulating in one of the rotors then in the stator, namely in the teeth 21 thereof along an axis substantially parallel to the axis of rotation of the machine, before circulating in the second rotor situated on the other side of the stator. In a rotor, the flux circulates from the claw-poles of a given polarity, which are attached to one of the coaxial rotor armatures 42a, into this coaxial rotor armature 42a, into the ferromagnetic ring 52, before returning to the other coaxial rotor armature 42b then into the claw-poles of the other polarity, which are attached to this other coaxial rotor armature 42b.

Obviously, the invention is not limited to the exemplary embodiments which have just been described.

It is notably possible to multiply the number of stators.

The expression "comprising a" should be understood to be synonymous with "comprising at least one".

The invention claimed is:

1. Rotating electrical machine comprising at least one stator and at least two rotors, which are arranged on either side of the stator along an axis of rotation of the machine,
   said at least one stator comprising teeth and windings arranged on the teeth, and
   each of said at least two rotors comprising two mutually coaxial rotor armatures, each bearing claw-poles arranged to interact magnetically with the teeth of the stator, the claw-poles of an armature being arranged circumferentially in alternation with the claw-poles of the other armature, and the magnetic flux being oriented in the air gap formed between the rotor and the stator in a direction substantially parallel to the axis of rotation of the machine, the teeth of the stator each being of generally substantially prismatic form, wherein the teeth of the stator are attached to an annular stator armature, and wherein the teeth of the stator each bear two windings arranged on the corresponding tooth on either side of the annular stator armature, each of the two windings facing one of the two rotors.

2. Rotating electrical machine according to claim 1, in which the teeth of the stator include, in cross section taken at right angles to the axis of rotation of the machine, two portions of concentric circles linked by two radii.

3. Machine according to claim 1, in which each of the rotors further comprises a toroidal excitation coil arranged between the two cylindrical and coaxial rotor armatures.

4. Machine according to claim 1, in which the excitation coil is fixed relative to the stator.

5. Machine according claim 1, in which each of the rotors further comprises a fixed ferromagnetic ring arranged so as to be passed through radially by the field winding magnetic flux.

6. Machine according to claim 1, in which each of the rotors comprises two auxiliary rotor air gaps, each of the auxiliary rotor air gaps being formed respectively between the ferromagnetic ring of said rotor and one of the cylindrical rotor armatures.

7. Machine according to claim 1, in which each of the cylindrical armatures of a rotor comprises a number of claw-poles equal to half the number of poles of the machine.

8. Machine according to claim 1, in which the two rotors surrounding the stator are angularly offset relative to one another.

9. Machine according to claim 1, comprising a shaft secured to the rotors, which rests by at least one bearing.

10. Rotating electrical machine, comprising a plurality of machines according to claim 1, each consisting of a stator and two rotors, arranged on a common axis of rotation.

11. Machine according to claim 1, comprising three machines each consisting of a stator and two rotors arranged on a common axis of rotation, in which the windings of the stators are three-phase, with one phase per stator.

12. Machine according to claim 1, forming a motor.

13. Machine according to claim 1, forming a generator.

* * * * *